US010284659B2

(12) United States Patent
Cheshire

(10) Patent No.: US 10,284,659 B2
(45) Date of Patent: May 7, 2019

(54) HYBRID UNICAST/MULTICAST DNS-BASED SERVICE DISCOVERY

(71) Applicant: Apple Inc., Cupertino, CA (US)

(72) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 922 days.

(21) Appl. No.: 14/157,422

(22) Filed: Jan. 16, 2014

(65) Prior Publication Data

US 2014/0214958 A1 Jul. 31, 2014

Related U.S. Application Data

(60) Provisional application No. 61/757,036, filed on Jan. 25, 2013.

(51) Int. Cl.

*G06F 15/16* (2006.01)
*H04L 29/08* (2006.01)
*H04L 29/12* (2006.01)

(52) U.S. Cl.

CPC .......... *H04L 67/16* (2013.01); *H04L 61/1511* (2013.01); *H04L 61/1541* (2013.01)

(58) Field of Classification Search

CPC ........................................................ H04L 67/16

(Continued)

(56) References Cited

U.S. PATENT DOCUMENTS 6,640,240 B1 * 10/2003 Hoffman ........... G06F 17/30899 707/E17.119
2003/0140119 A1 * 7/2003 Acharya ................. H04L 29/06 709/219

(Continued)

FOREIGN PATENT DOCUMENTS

CN 101069159 A 11/2007
CN 101473597 A 7/2009

(Continued)

OTHER PUBLICATIONS

Cheshire, S., et al. "RFC 6762: Multicast DNS" Internet Engineering Task Force. Feb. 2013. Accessed at: <http://ietf.org/rfc/rfc6762.txt>.

(Continued)

*Primary Examiner* — Hamza N Algibhah

(74) *Attorney, Agent, or Firm* — Sterne, Kessler, Goldstein & Fox P.L.L.C.

(57) ABSTRACT

This document describes a "hybrid proxy," which is a network node that enables hosts outside of a link to discover services that are available on the link, by answering service discovery queries from hosts outside of the link. A hybrid proxy may use "zero configuration" networking technologies such as Multicast Domain Name System (mDNS), Domain Name System-Service Discovery (DNS-SD), and/or Domain Name System Long-Lived Queries (DNS-LLQ). As one example, a hybrid proxy may receive a unicast DNS-SD query, transmit a corresponding mDNS query on its link to obtain information responsive to the query, and then transmit a unicast DNS-SD response to the querying host. As another example, a hybrid proxy may receive a unicast DNS-LLQ query, transmit an initial DNS-LLQ answer to the querying host, transmit an mDNS query on its link to obtain additional information, and then transmit subsequent DNS-LLQ update messages to the querying host.

10 Claims, 5 Drawing Sheets

(58) Field of Classification Search
USPC .......................................................... 709/204
See application file for complete search history.

(56) References Cited

U.S. PATENT DOCUMENTS

| | | | |
|---|---|---|---|
| 2007/0150570 A1 | 6/2007 | Eastham | |
| 2011/0158088 A1 | 6/2011 | Lofstrand et al. | |
| 2011/0182205 A1 | 7/2011 | Gerdes et al. | |
| 2013/0151649 A1* | 6/2013 | Luna | H04W 28/02 709/213 |
| 2013/0179489 A1* | 7/2013 | Daley | H04L 67/2828 709/203 |
| 2014/0089468 A1* | 3/2014 | Joong | H04L 67/2847 709/219 |
| 2014/0089478 A1 | 3/2014 | Seed et al. | |

FOREIGN PATENT DOCUMENTS

| | | |
|---|---|---|
| CN | 101611609 A | 12/2009 |
| WO | WO 2007/142485 A1 | 12/2007 |
| WO | WO 2012/085220 A1 | 6/2012 |

OTHER PUBLICATIONS

Cheshire, S., et al. "RFC 6763: DNS-Based Service Discovery" Internet Engineering Task Force. Feb. 2013. Accessed at: <http://www.ietf.org/rfc/rfc6763.txt>.

Mockapetris, P. "RFC 1035: Domain Names—Implementation and Specification", Network Working Group. Nov. 1987. Accessed at: <http://www.ietf.org/rfc/rfc1035.txt>.

Sekar, K., et al. "DNS Long-Lived Queries" Internet Draft. Aug. 2006. Accessed at <http://tools.ietf.org/html/draft-sekar-dns-llq-01>.

Vixie, P. "RFC 2671: Extension Mechanisms for DNS (EDNS0)" Networking Working Group. Aug. 1999. Accessed at: <http://tools.ietf.org/html/rfc2671>.

Cheshire, S., et al. "DNS Long-Lived Queries," Internet Draft, Accessed at: http://tools.ietf.org/html/draft-sekar-dns-liq-01, 18 pages (Aug. 10, 2006).

Edwards, W.K., Discovery Systems in Ubiquitous Computing, *Pervasive Computing*, IEEE CS and IEEE ComSoc, pp. 70-77 (Apr.-Jun. 2006).

Pääkkönen, P. et al., Scalability of Name Resolution for Ambient Networks, *Wired/Wireless Internet Communications*, Springer-Verlag Berlin Heidelberg, pp. 166-177 (2006).

* cited by examiner

HYBRID UNICAST/MULTICAST DNS-BASED SERVICE DISCOVERY

RELATED APPLICATION

This application hereby claims priority under 35 U.S.C. § 119 to U.S. Provisional Application No. 61/757,036, entitled "HYBRID UNICAST/MULTICAST DNS-BASED SERVICE DISCOVERY," by inventor Stuart D. Cheshire filed on 25 Jan. 2013.

BACKGROUND

Technical Field

This document describes networking technology. More specifically, this document describes approaches for discovering services available on a link from outside of the link, using technologies such as Domain Name System Service Discovery (DNS-SD), Multicast Domain Name System (mDNS), and DNS Long-Lived Queries (DNS-LLQ).

Related Art

Service discovery (using DNS-SD or other approaches) allows hosts to find information about services provided by other hosts. For example, a host may use DNS-SD to discover a network-connected printer that offers printing services, and then print a document via the discovered printer over the network.

Approaches for enabling service discovery across different networks (e.g., discovery of services available on a private network from across the Internet) have been proposed; however, these approaches possess a number of limitations. Given the ever-increasing importance of service discovery, improvements to current service discovery techniques would be advantageous.

SUMMARY

This document describes, inter alia, a "hybrid proxy," which is a network node that enables hosts outside of a given link to discover services that are available on the link, by answering service discovery queries that it receives from hosts outside of the link. A hybrid proxy may be implemented, for example, on a router, wireless access point (AP), gateway, or other device that serves and/or otherwise resides on a link. This document also describes other host devices (e.g., computers, smartphones, printers, cameras, and so on) and how these other host devices may interact with the hybrid proxy.

This summary is provided to offer some exemplary embodiments so as to provide a basic understanding of some aspects of the subject matter described herein. Accordingly, it will be appreciated that the above-described features are merely examples and should not be construed as narrowing the scope or spirit of the subject matter described herein in any way. Other features, aspects, and advantages of the subject matter described herein will become apparent from the following detailed description, figures, and claims.

DETAILED DESCRIPTION

Overview

This document describes, inter alia, a "hybrid proxy," which is a network node that enables hosts outside of a link to discover services that are available on the link. A hybrid proxy may be implemented on a router, a wireless access point (AP), a server computer, or any other device operating on the link.

A hybrid proxy may provide information regarding services on its link to a querying host outside of the link as follows: the hybrid proxy receives a query regarding services on the link from the querying host; the hybrid proxy obtains information for responding to the query (for example, by issuing mDNS queries on its link, by accessing a database/cache of DNS records, and/or via other approaches); and the hybrid proxy transmits one or more messages to the querying host that include information that is responsive to the query. The initial query received by the querying host may be formatted, for example, as a unicast DNS-SD query message, and the one or more messages that include responsive information may also be formatted as unicast DNS-SD response messages. Alternatively or additionally, the initial query may be formatted as a DNS-LLQ query, and the one or more response messages may include one or more DNS-LLQ ACK/Answers messages and/or DNS-LLQ Event Response messages.

Figure 1:
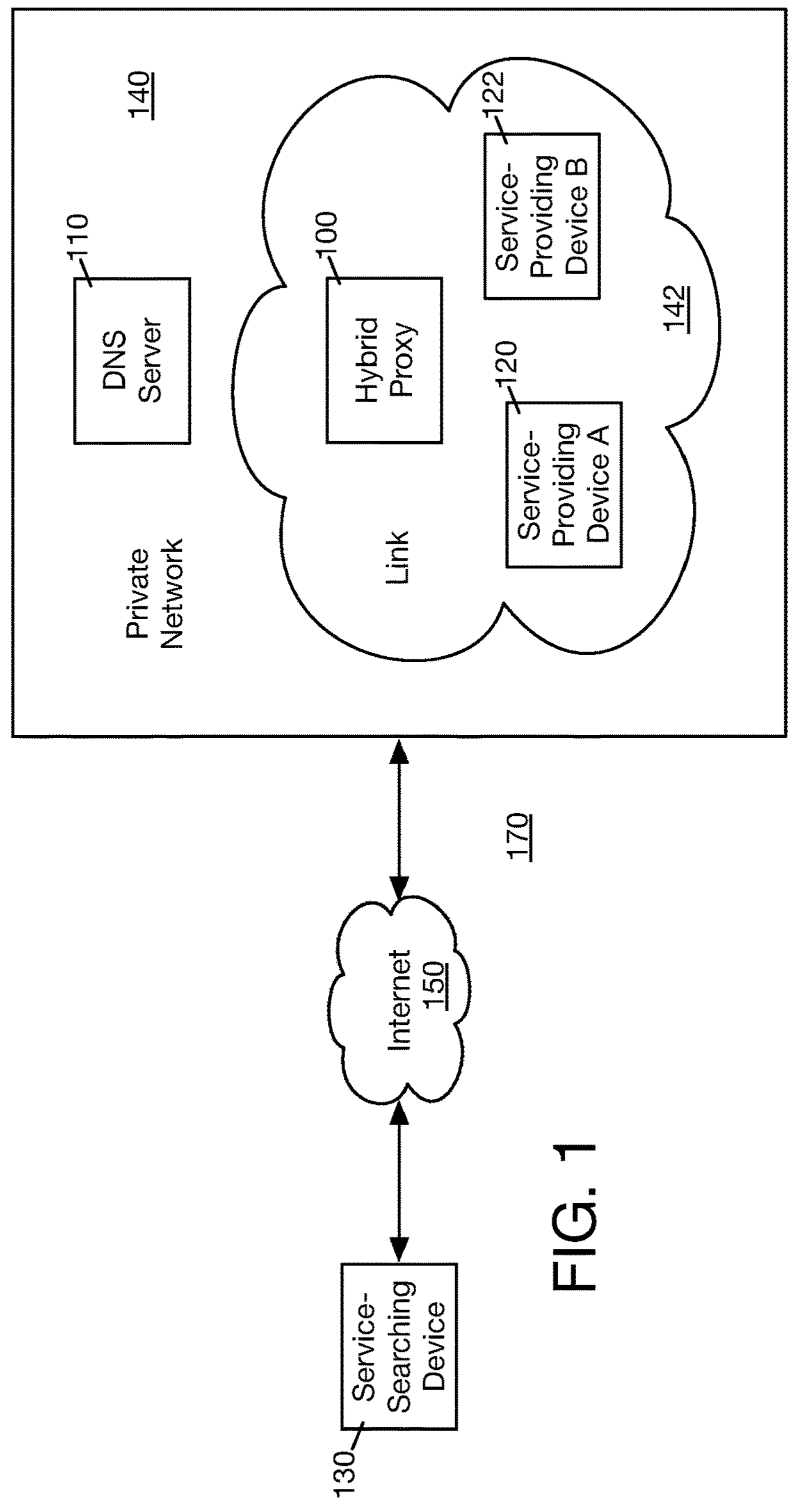
FIG. 1 shows an exemplary network architecture.
Figure 2:
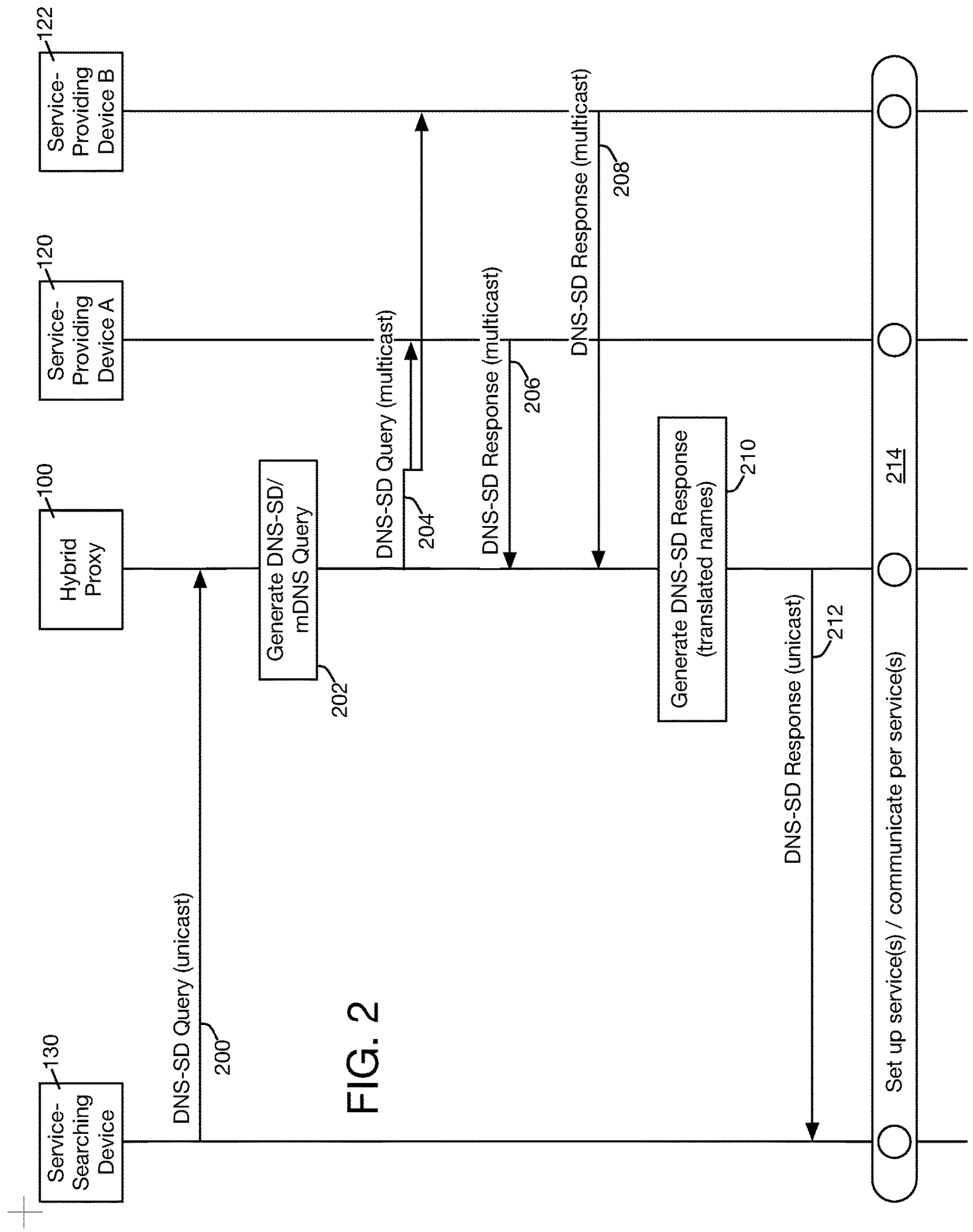
FIG. 2 shows a first exemplary method for performing service discovery.
Figure 3A:
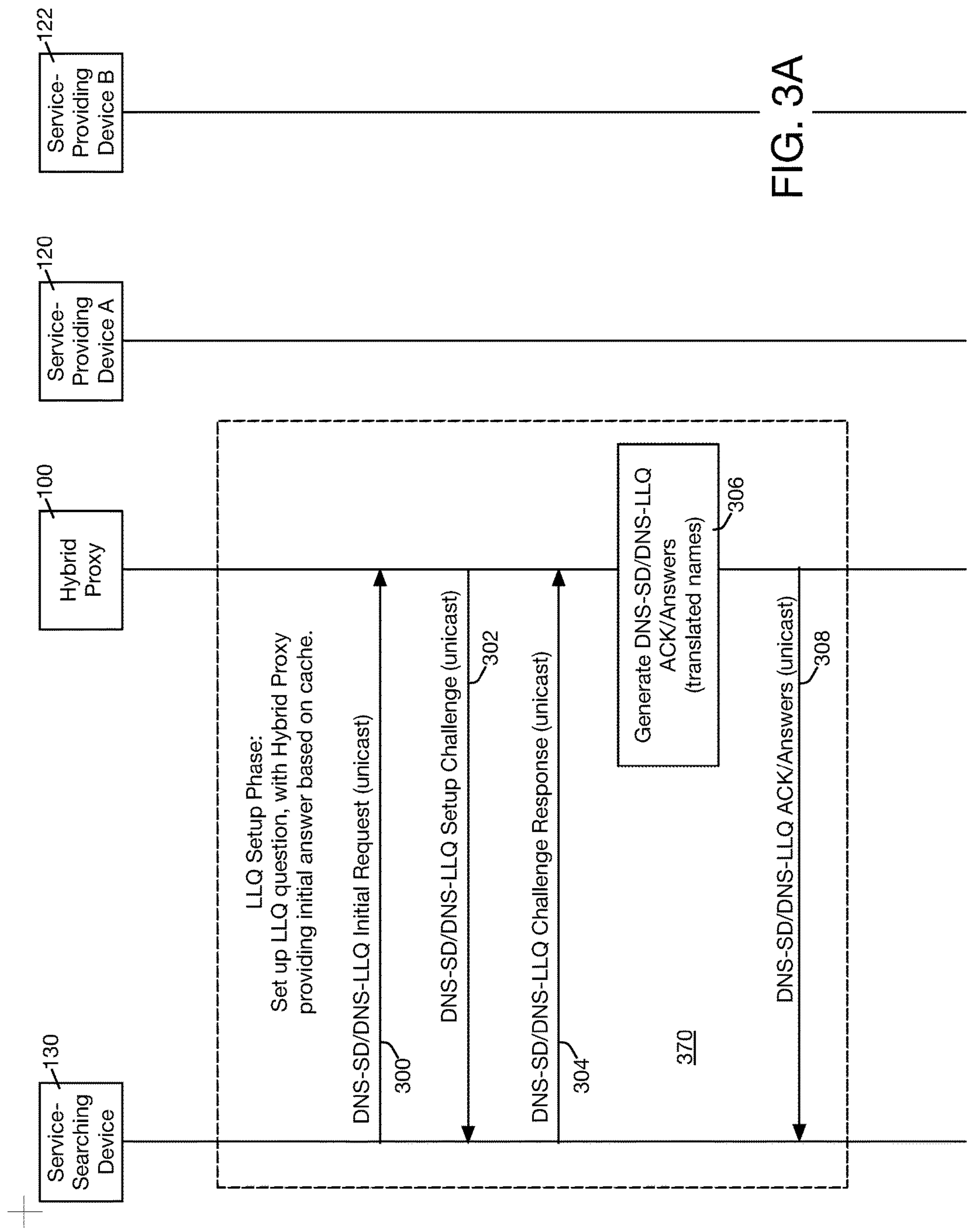
FIGS. 3A-3B show a second exemplary method for performing service discovery.
Figure 3B:
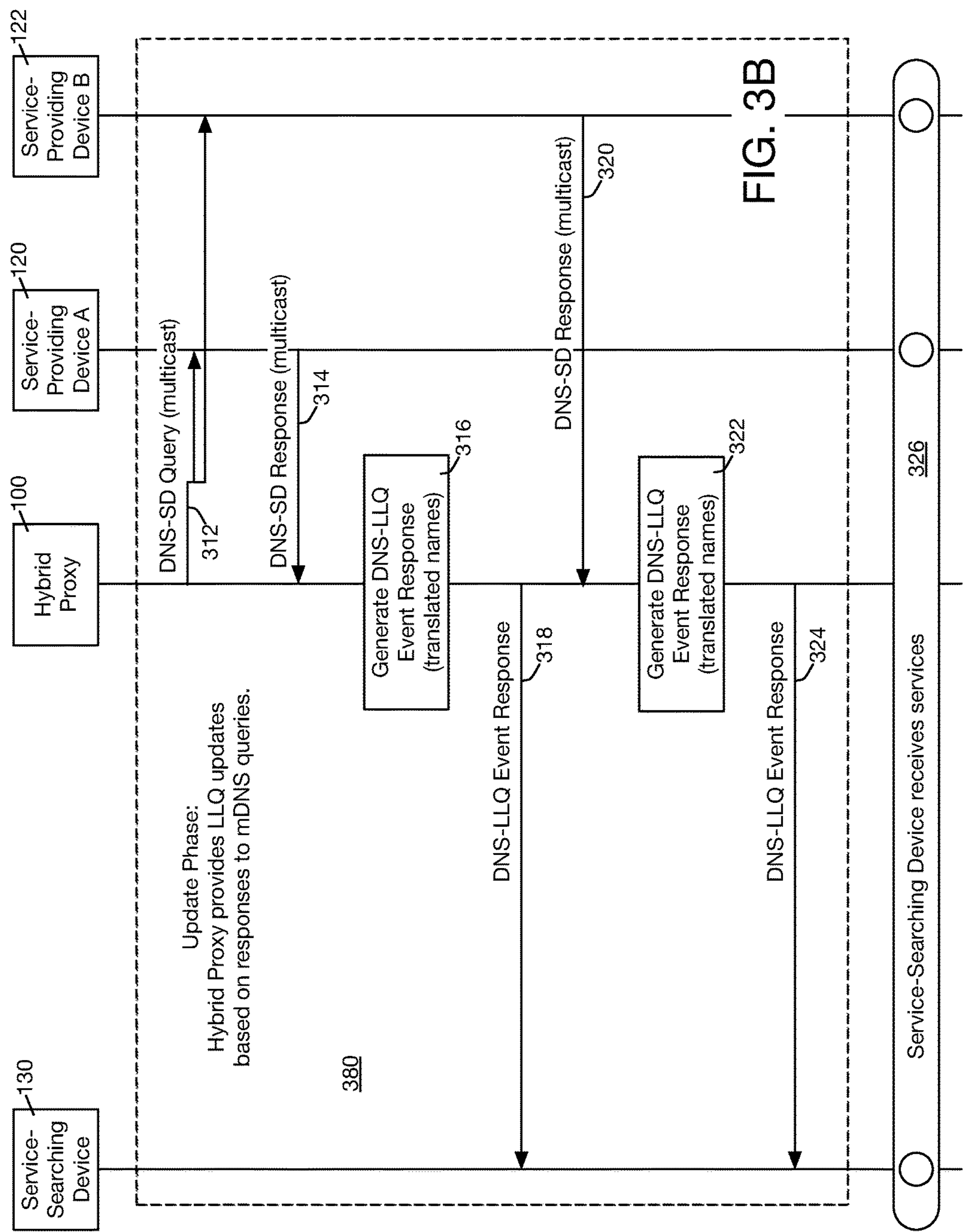
Figure 4:
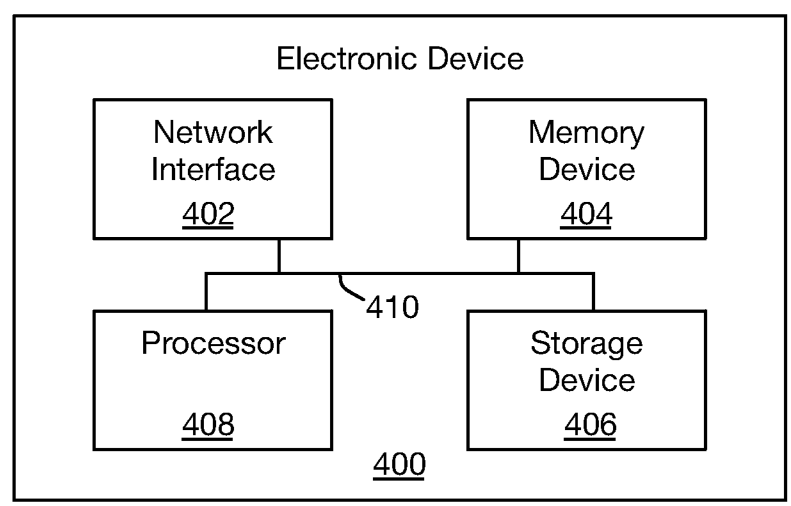
FIG. 4 shows an exemplary electronic device that may be used to implement the features described herein.

FIG. 1 shows an exemplary network architecture where a hybrid proxy and related functionality may be implemented. FIGS. 2 and 3A-3B show two exemplary methods wherein a hybrid proxy provides service information regarding a local link to a querying host outside of the link. FIG. 4 shows an exemplary electronic device that may be used to implement hybrid proxy functionality and/or functionality performed by other devices/entities described herein.

Glossary of Terms

The following is a glossary of terms used in this document:

Link: Link is a physical layer concept. Using Ethernet as an example, when an Ethernet broadcast is sent, all of the hosts that receive that broadcast are on the same link. More specifically, a set of hosts is considered to be on the same link if: (a) when any host from that set sends a packet to any other host in that set (using unicast, multicast, or broadcast), the entire link-layer packet payload arrives unmodified; and (b) a broadcast sent by any host from that set of hosts is received by every other host in the set. (For the purposes of conditions (a) and (b), this means that a packet may pass through devices such as repeaters, bridges, hubs or switches and still be considered to be on the same link, but if the packet passes through a device such as an IP router that modifies the IP header, then the hosts are not on the same link.) In some instances (though not always), a link may be exactly coextensive with (i.e., include the same set of hosts as) a subnet.

Subnet: Subnet is a network-layer concept. A subnet is a range of IP addresses that are all mutually reachable from one another, directly, without going through a router. As mentioned above, a subnet may be exactly coextensive (i.e., include the same set of hosts) with a link, though this is not always the case; for example, it does occur in practice that a link may be configured to include multiple subnets.

DNS message: A DNS message is formatted according to DNS technology, described in, inter alia, the "Domain Names-Implementation and Specification" RFC (available as of the filing date of this document at http://www.ietf.org/rfc/rfc1035.txt), which is hereby incorporated herein by reference for all purposes, and which is hereinafter referred to as the "DNS Protocol Specification." A unicast DNS message may include the fields/sections shown in Table A.1:

TABLE A.1

| DNS Message | |
|---|---|
| Section | Description |
| Header | Contains control information, such as whether the DNS message is a query or response. |
| Question | Contains tuples ("question entries") that describe questions/requests for information. See Table A.2. |
| Answer | If present, contains answer to a query. |
| Authority | If present, identifies an authoritative DNS server. |
| Additional | If present, includes other/optional information. |

The information in the Answer, Authority, and Additional sections may include data formatted as DNS resource records. The Header section may include a QDCOUNT field, ANCOUNT field, NSCOUNT field, and ARCOUNT field, indicating, respectively, the number of question entries/resource records in the Question, Answer, Authority, and Additional sections. The Header section may also include, among other fields, a Query/Response (QR) field, which is a one-bit field that indicates whether the message is a query or a response.

DNS query message: A DNS query message is a DNS message that indicates one or more questions/requests for information. In a DNS query message, the QR field in the Header field may be set to a value of zero to indicate that the message is a query message. Additionally, the message's Question section may include one or more tuples, each of which constitutes a question entry. A question entry may include the fields shown in Table A.2:

TABLE A.2

| Question Entry in Question Section in DNS Message | |
|---|---|
| Field | Description |
| QNAME | Specifies a domain name for the question. |
| QTYPE | Specifies type of question (e.g., whether the question is for pointer (PTR) resource records or Name Server (NS) resource records). |
| QCLASS | Specifies the class of the question. |

DNS response message: A DNS response message is a DNS message that may be responsive to a DNS query message. In a DNS response message, the QR field in the Header field may be set to a value of one to indicate that the message is a response message. Additionally, the Answer field in a DNS response message may include one or more resource record fields that include information that is responsive to a DNS query message.

DNS resource record: A resource record is a data element that may be used in DNS messages, and may also be used by DNS servers and other hosts for storing DNS data (including in zone files). The Answer, Authority, and Additional sections in DNS messages may include data formatted as resource records. A resource record may include the fields shown in Table A.3:

TABLE A.3

| Resource Record | |
|---|---|
| Field | Description |
| NAME | Specifies a domain name to which the resource record pertains. |
| TYPE | Specifies the meaning (type) of the payload data in the RDATA field. |
| CLASS | The class of the payload data in the RDATA field. |
| TTL | A time interval (in seconds) that the resource record may be cached before discard. |
| RDLENGTH | The size (in octets) of the RDATA field. |
| RDATA | Includes the payload data for the resource record. |

A number of different sub-types of resource records exist (such as Pointer (PTR) resource records, Service (SRV) resource records, and Text (TXT) resource records), which may be used for various purposes.

DNS Pointer (PTR) resource record: A PTR resource record is a resource record that is used to point to a location in the domain namespace. In a PTR resource record, the RDATA field may be used to store the location that is pointed to. For example, for a PTR resource record that points to name "server._nfs._tcp," the value for the RDATA field would be set to "server._nfs._tcp."

Service (SRV) resource record: A SRV resource record is a resource record that may be used to specify information regarding a service that is available in a domain. In a SRV resource record, the NAME field may be used to indicate identifying information for the service, such as the name of the service, a protocol that the service uses (such as Universal Datagram Protocol (UDP) or Transmission Control Protocol (TCP)). Additionally, the RDATA field in a SRV resource record may include the fields shown in Table A.4:

TABLE A.4

| Fields in RDATA Field in SRV Resource Record | |
|---|---|
| Field | Description |
| PRIORITY | Priority of host specified in TARGET field (relative to other hosts that may also offer service). |
| WEIGHT | Specifies a priority ("weight") relative to any other records that have the same value for PRIORITY. |
| PORT | The port on the target host (specified in TARGET field) for this service. The range is 0-65535. |
| TARGET | Domain name that resolves to the IP address of the target host (i.e., the host offering the service). |

Text (TXT) resource record: A TXT resource record may be used to hold descriptive text. In a TXT resource record, the descriptive text may be included in the RDATA field.

Multicast Domain Name System (mDNS): Multicast DNS (mDNS) is a technology that provides the ability to perform DNS-like operations on a link without requiring a conventional unicast DNS server. Per mDNS, a portion of the DNS namespace (the ".local" top-level domain (TLD)) is assigned to be free for local use on a link, without the need to set up delegations or otherwise configure a conventional DNS server to answer for those names. Portions of mDNS technology are specified in the "Multicast DNS" Standard (RFC 6762, available as of the filing date of this document at <http://www.ietf.org/rfc/rfc6762.txt>), which is hereby incorporated herein by reference for all purposes, and which is hereinafter referred to as the "Multicast DNS Protocol Specification."

mDNS message: An mDNS message is a message that is formatted at least in part according to the Multicast DNS Protocol Specification. A particular multicast IP address and UDP port have been allocated for the communication of mDNS messages: 224.0.0.251 for IP version 4 (IPv4) (or FF02::FB for Internet Protocol (IP) version 6 (IPv6)), at UDP port 5353. mDNS messages may be communicated using this multicast address/port combination.

Domain Name System-Service Discovery (DNS-SD): DNS-SD is a technology that allows a host to discover a list of named instances of a desired service, using DNS query messages. Portions of DNS-SD technology are specified in the "DNS-Based Service Discovery" Standard (RFC 6763, available as of the filing date of this document at <http://www.ietf.org/rfc/rfc6763.txt>), which is hereby incorporated herein by reference for all purposes, and which is hereinafter referred to as the "DNS-SD Protocol Specification."

Per DNS-SD, a service instance can be described (and discoverable) using a combination of DNS PTR, SRV, and TXT resource records. A DNS-SD query may query for PTR records, and a corresponding DNS-SD response may point to DNS SRV and TXT records.

As one example of how PTR, SRV, and TXT resource records may be organized, a DNS server (or other host) may store, for each service instance, the following information:

(a) a SRV resource record, where the NAME field for the SRV record indicates the name of the service instance in <instance>.<service-type>.<domain> format (e.g., "File Server A._nfs._tcp.example.com"), and where the TARGET field in the RDATA indicates the domain name of the host offering the service instance;

(b) a PTR resource record that points to the SRV record (e.g., a PTR record where the value for the NAME field is "_nfs._tcp.example.com" and the value for the RDATA field is "File Server A._nfs._tcp.example.com"); and (c) a TXT resource record, where the NAME field has the same value as the NAME field in the SRV resource record, and where the RDATA field includes one or more key/value pairs related to establishing the service (e.g., "path=/files/nfs/shares").

DNS-SD query message: A DNS-SD query message is a DNS query message that is formatted at least in part according to the DNS-SD Protocol Specification. A DNS-SD query message may query for a DNS PTR record, using a query string in the QNAME field in a question entry in the Question section of the message. A query string may have the format <service-type>.<domain>, indicating that the querying host is looking for service of a particular type (defined in the <service-type> portion) in a particular domain (defined in the <domain> portion). As an example, the following string indicates a query for "printer" service instances in the "example.com" domain: "_printer._tcp.example.com." (The "_tcp" text in the <service-type> in the preceding example indicates that the "printer" service is expected to be available over TCP.) Table A.5 shows an example of values that may be included in a question entry in a DNS-SD query message:

TABLE A.5

Question Entry in Question Section in DNS-SD Query

| Field | Value |
|---|---|
| QNAME | <service-type>.<domain> |
| QTYPE | PTR |
| QCLASS | IN |

DNS-SD response message: A DNS-SD response message is a DNS response message that, at least in part, is formatted according to the DNS-SD Protocol Specification, and which may be responsive to a DNS-SD query message. In a DNS-SD response message, the Answer field may be a DNS PTR resource record, where the RDATA field in the PTR resource record specifies a service instance using the format <instance>.<service-type>.<domain>. As an example, the following string indicates an instance of a printing ("_printer._tcp") service, where the instance is labeled "My Printer" and where the domain is "example.com": "My Printer._printer._tcp.example.com." Table A.6 shows an exemplary PTR resource record that may be included in an Answer section of a DNS-SD response message:

TABLE A.6

PTR Resource Record in Answer Section in DNS-SD Response

| Field | Value |
|---|---|
| NAME | <service-type>.<domain> |
| TYPE | PTR |
| CLASS | IN |
| TTL | <TTL value> |
| RDLENGTH | <RDLENGTH value> |
| RDATA | <instance>.<service-type>.<domain> |

DNS Long-Lived Queries (DNS-LLQ): DNS-LLQ is an extension to DNS that enables a querying host to issue "long-lived" questions, whereby the answering host provides an initial answer based on current information and also notifies the querying host about changes to DNS data over time. Portions of DNS-LLQ technology are specified in the "DNS Long-Lived Queries" Internet Draft (available as of the filing date of this document at http://tools.ietf.org/html/draft-sekar-dns-llq-01), which is hereby incorporated herein by reference for all purposes, and which is hereinafter referred to as the "DNS-LLQ Protocol Specification." Portions of DNS-LLQ technology are also specified in the "Extension Mechanisms for DNS (EDNS0)" RFC (available as of the filing date of this document at http://tools.ietf.org/html/rfc2671), which is hereby incorporated herein by reference for all purposes, and which is hereinafter referred to as the "EDNS0 Protocol Specification."

To set up a DNS-LLQ query, a four-step handshaking procedure may be performed, using four different sub-types of DNS-LLQ messages, which are the following:

(a) the DNS-LLQ Initial Request message, which is sent by the querying host to the answering host and which initiates one or more questions;

(b) the DNS-LLQ Setup Challenge message, which is sent by the answering host to the querying host responsive to the DNS-LLQ Initial Request message, and which establishes a unique identifier for each of the questions;

(c) the DNS-LLQ Challenge Response message, which is sent by the querying host to the answering host responsive to the DNS-LLQ Setup Challenge message, to indicate that the Setup Challenge message has been received; and (d) the DNS LLQ ACK/Answers message, which is sent by the answering host to the querying host to acknowledge receipt of the DNS-LLQ Challenge Response message (thereby indicating completion of setup of the long-lived query), and which also includes answers to the questions based on information possessed at that time by the responding host.

Additionally, when an update to the querying host should be sent during the life of a long-lived query (e.g., when the answering host obtains new information that matches a question), the answering host may send update information to the querying host using another type of DNS-LLQ message (the DNS-LLQ Event Response message).

DNS-LLQ message: A DNS-LLQ message is a DNS message that is formatted at least in part according to the DNS-LLQ Protocol Specification and the EDNS0 Protocol Specification. In this message, the Additional section may be used to carry one or more Option (OPT) resource records (also referred to as "pseudo resource records," "OPT pseudo-RRs," or "OPT-RRs"). An OPT resource record may be formatted as shown above in Table A.3; i.e., an OPT resource record may include the following fields: NAME, TYPE, CLASS, TTL, RDLENGTH, and RDATA. In a DNS-LLQ message, the RDATA field in the OPT resource record may include one or more "LLQ metadata" entries, each of which may include the fields shown in Table A.7:

TABLE A.7

LLQ Metadata Entry in RDATA in OPT RR in Additional Section in DNS-LLQ Message

| Field | Description |
|---|---|
| OPTION-CODE | Specifies that this RDATA relates to DNS-LLQ; value for this field will be set to one (which corresponds to "LLQ".) |
| OPTION-LENGTH | Indicates length of fields that follow (VERSION, and so on.) |
| VERSION | Version of LLQ protocol implemented by requester. |
| LLQ-OPCODE | Identifies the type of LLQ operation to which message relates. Possible values include: LLQ-SETUP (where the field has a value of one); LLQ-REFRESH (value of two); and LLQ-EVENT (value of three). |
| ERROR-CODE | Specifies success or a type of error. |
| LLQ-ID | Identifier of an LLQ query. |
| LEASE-LIFE | Requested or granted life of LLQ query, in seconds. |

DNS-LLQ Initial Request message: This is a DNS-LLQ message that is used by a host to initially request the setup of a long-lived query. This message is a DNS query message (i.e., its QR field in its Header field indicates that the message is a query), and may include one or more question entries in the Question section (as described above with reference to Table A.2 and/or Table A.5); and, for each question entry, the message may include corresponding DNS-LLQ metadata in its Additional section. In the DNS-LLQ metadata entries, the LLQ-OPCODE fields are set to LLQ-SETUP and the LLQ-ID fields are set to zero.

DNS-LLQ Setup Challenge message: This is a DNS-LLQ message that is sent in response to a DNS-LLQ Initial Request message. This message is a DNS response message, and may include question entries in the Question section that are identical (or similar) to the question entries from the corresponding Initial Request message. Additionally, the Setup Challenge message includes LLQ metadata entries (one for each LLQ metadata entry in the corresponding Initial Request Message), wherein each of the LLQ-ID fields in the LLQ metadata entries indicates a unique identifier.

DNS-LLQ Challenge Response message: This is a DNS-LLQ message that is sent in response to a DNS-LLQ Setup Challenge message. This message is a DNS query message, and may include question entries in the Question section that are identical (or similar) to the question entries from the corresponding Initial Request message, as well as LLQ metadata identical (or similar) to that received in the corresponding Setup Challenge message (thereby echoing the unique LLQ-IDs included in the corresponding Setup Challenge message).

DNS-LLQ ACK/Answers message: This is a DNS-LLQ message that is sent in response to a DNS-LLQ Challenge Response message. This is a DNS response message, and acknowledges receipt of the DNS-LLQ Challenge Response message. This message may include resource records in the Answer section that match the criteria of the question entries indicated in the corresponding Initial Request message; in other words, this message provides the initial answer (based on currently available information) to the questions posed in the Initial Request message.

DNS-LLQ Event Response message: This is a DNS-LLQ message that is sent when new data is obtained by an answering host that matches an established DNS-LLQ question, and is used to update the querying host with respect to the new data. This message is a DNS response message, with the following attributes: the Question section may include the question entries being answered (i.e., the question entries originally received in the initiating Initial Request message); the Answer section may include one or more resource records that match the question entries being answered; and the RDATA field in the OPT resource record in the Additional section may include LLQ metadata entries, one for each question being answered. In each of the LLQ metadata entries, the LLQ-OPCODE field is set to a value of LLQ-EVENT, and the LLQ-ID field is set to the unique identifier for each metadata entry.

Database: A database is any structured collection of data, such as but not limited to a relational database, a hierarchical database, an object-oriented database, a No-SQL database, or a structured flat file. A DNS zone file is an example of a database.

Non-transitory computer-readable medium: A device for data storage, such as a hard disk, an optical medium (such as a CD-ROM, a DVD, or a Blu-Ray Disc), a magneto-optical medium, a memory device (such as a Dynamic Random-Access Memory (DRAM), Static RAM (SRAM), or other type of Random-Access Memory (RAM)), a register, a cache memory, a Read-Only Memory (ROM), a flash memory (based on, e.g., EEPROM flash memory technology or NAND flash memory technology), or other type of non-transitory device for electronic data storage. A non-transitory computer-readable medium is distinguishable from a transitory computer-readable medium, such as a transitory signal.

FIG. 1—Exemplary Network Architecture

FIG. 1 shows an exemplary network architecture 170 that includes a Service-Searching Device (SSD) 130, the Internet 150, and a private network 140. The private network 140 may be operated under the control and/or on behalf of a single entity (e.g., a corporation, university, individual person, or other entity), and the private network 140 includes a link 142, on which a hybrid proxy 100 and two exemplary host devices (Service-Providing Device (SPD) A 120 and SPD B 122) operate. In the example of FIG. 1, the hybrid proxy 100 may function as a router, and perform routing functionality for the link 142 on which it operates. As will be described in further detail below, the SSD 130 may search for services provided by SPD A 120 and SPD B 122 by communicating with the hybrid proxy 100.

As shown in FIG. 1, the private network 140 also includes a DNS server 110. The DNS server 110 in the private network 140 may be configured as the central name server for the private network 140. When a requesting host wishes to obtain the IP address of a host within the private network 140, the requesting host may do so by querying the DNS server 110. Prior to communicating with the hybrid proxy 100, the SSD 130 may obtain the IP address(es) and/or domain names (or subdomain names) it needs in order to communicate with the hybrid proxy 100 via the DNS server 110. The link 142 on which the hybrid proxy 100 operates may be assigned a unique DNS domain/subdomain name (e.g., "Building A.example.com" or "Fifth Floor.Building A.example.com"); in such an instance, the DNS Name Server (NS) records stored by the DNS server 110 may be used to delegate ownership of the domain name for the link 142 to the hybrid proxy 100. The link 142 may be, for example, an Ethernet link or a wireless link (based on a technology such as IEEE 802.11 wireless networking technology), and/or may be based on any other appropriate type of networking technology.

SPD A 120 and SPD B 122 are electronic devices that offer networked services. SPD A 120 and/or SPD B 122 may be, for example, a laptop computer, a tablet computer, a server computer, a printer or copy machine, a scanner, a camera, a cellular phone, and/or any other type of electronic device capable of offering services. The SSD 130 may be, for example, a laptop computer, a server computer, a tablet computer, a cellular phone, and/or any other appropriate type of electronic device for searching for services.

When the SSD 130 wishes to use services, it may issue a query to the hybrid proxy 100 via the Internet 150. The hybrid proxy 100 then obtains/generates information that is responsive to the query, and transmits one or more response messages back to the SSD 130 via the Internet 150. Based on the response, the SSD 130 may then connect to a device on the local link 142, and perform/receive services. For example: the SSD 130 may transmit a query to the hybrid proxy 100 (via the Internet 150) for available printer services; SPD A 120 may be a network-enabled printer, and may offer printer services, and the hybrid proxy 100 may transmit one or more response messages to the SSD 130 indicating that SPD A 120 offers the printer services (via the Internet 150); the SSD 130 may then connect to SPD A 120 (via the Internet 150) and print a document.

The hybrid proxy 100 may implement a number of different mechanisms for obtaining the information that is included in the response message(s) sent to the SSD 130. For example:

(a) The hybrid proxy 100 may, in response to receiving the query, generate an mDNS query that is transmitted to SPD A 120 and SPD B 122; the hybrid proxy 100 may then receive mDNS responses from SPD A 120 and SPD B 122, collate the information in the received mDNS responses, and transmit a corresponding query response to the SSD 130. One example of this approach is described herein with reference to FIG. 2.

(b) Alternatively or additionally, the hybrid proxy 100 may implement DNS-LLQ technology, and may store a database/cache of service information regarding the services offered by hosts on the link 142, including SPD A 120 and SPD B 122. (The hybrid proxy 100 may obtain the service information by periodically sending DNS-SD/mDNS queries on the link 142, and storing the corresponding response information in the database/cache. Alternatively or additionally, SPD A 120 and/or SPD B 122 may use mDNS response messages to announce the services that they support (upon connecting to the local link 142, periodically, and/or when the services that they offer change), and the hybrid proxy 100 may store this information in the database/cache upon receipt.) In response to the DNS-LLQ query for services, the hybrid proxy 100 may transmit an initial response/answer that includes stored/cached service information (if any stored/cached information is available); concurrently and/or substantially at the same time, the hybrid proxy 100 may also transmit mDNS queries to SPD A 120 and SPD B 122; and, upon receiving responses from SPD A 120 and/or SPD B 122, the hybrid proxy 100 may send corresponding DNS-LLQ update messages. One example of this approach is provided herein with reference to FIGS. 3A-3B.

As mentioned above, the hybrid proxy 100 and the two service-providing devices (SPD A 120/SPD B 122) may transmit mDNS messages to each other. Any mDNS messages described in this document as transmitted on the link 142 may be transmitted on multicast address 224.0.0.251:5353/[FF02::FB]:5353.

While the private network 140 of FIG. 1 is shown as including only a single link 142, this is done only for ease of description; the features described herein may be used on networks that include any number of links (from a single link to a very large number of links), with every link (or some subset thereof, as appropriate) having its own hybrid proxy instance. Alternatively or additionally, a network may be configured to use a single hybrid proxy instance for multiple links that exist in the network. Such a configuration may be implemented, for example, using virtual local area network (VLAN) technology, appropriate NS records in the DNS server(s) on the network, and/or other techniques.

FIG. 2—Method for Service Discovery

FIG. 2 shows a first method for performing service discovery. In the method of FIG. 2, the hybrid proxy 100 receives a service discovery query, issues queries on its local link 142 to obtain information to respond to the service discovery query, and then provides a response to the service discovery query.

The method of FIG. 2 begins (at step 200) with the SSD 130 transmitting a unicast DNS-SD query message to the hybrid proxy 100. In an example where the hybrid proxy 100 is assigned to subdomain "Building A.example.com" and where the query message asks for instances of printing services, the DNS-SD query message may be a DNS message with a question entry that includes values as shown in Table B.1:

TABLE B.1

PTR Question Entry for Exemplary Unicast DNS-SD Query

| Field | Value |
|---|---|
| QNAME | _printer._tcp.Building A.example.com |
| QTYPE | PTR |
| QCLASS | IN |

At step 202, the hybrid proxy 100 generates a DNS-SD/mDNS query message that corresponds to the query message received at step 200. This may involve translating the global domain name in the QNAME field in the received question entry to the ".local" domain used for mDNS queries. Continuing with the example of Table B.1, the hybrid proxy 100 may generate an mDNS query message with a question entry that includes values shown in Table B.2:

TABLE B.2

| Question Entry for Exemplary DNS-SD/mDNS Query | |
|---|---|
| Field | Value |
| QNAME | __printer.__tcp.local |
| QTYPE | PTR |
| QCLASS | IN |

As shown in Table B.2, the <service-type> portion of the QNAME field (i.e., "_printer._tcp") is the same as in Table B.1, while the <domain> portion is changed (from "Building A.example.com" to ".local").

At step 204, the hybrid proxy 100 transmits the generated DNS-SD/mDNS query message on its link 142, and SPD A 120 and SPD B 122 receive the query message.

As will be described in further detail below, the hybrid proxy 100 may expect to receive one or more responses to the DNS-SD/mDNS query message transmitted at step 204. Depending upon the implementation, the hybrid proxy 100 may expect to receive the responses within a given time window, and to take action based on the responses received within the given time window. To keep track of this time window, the hybrid proxy 100 may start a timer at step 204, and/or otherwise store information related to the time at which step 204 is performed.

At step 206, SPD A 120 generates and transmits a DNS-SD/mDNS response message that is responsive to the query received at step 204, and the hybrid proxy 100 receives the response message. Continuing with the example of Tables B.1-B.2, in an instance where SPD A 120 offers a printing service using the name "PrinterA," a resource record included in the Answer field of this response message may include values such as those shown in Table B.3:

TABLE B.3

| Resource Record in Exemplary DNS-SD/mDNS Response | |
|---|---|
| Field | Value |
| NAME | __printer.__tcp.local |
| TYPE | PTR |
| RDATA | PrinterA.__printer.__tcp.local |

At step 208, SPD B 122 generates and transmits a DNS-SD/mDNS response message, and the hybrid proxy 100 receives the response message. This response message may be generated similarly to the message mentioned above with respect to step 206. Continuing with the above example, in an instance where SPD B 122 offers a printing service using the name "PrinterB," a resource record included in the Answer field of the DNS response message generated/transmitted at step 208 may include values such as those shown in Table B.4:

TABLE B.4

| Resource Record in Exemplary DNS-SD/mDNS Response | |
|---|---|
| Field | Value |
| NAME | __printer.__tcp.local |
| TYPE | PTR |
| RDATA | PrinterB.__printer.__tcp.local |

At step 210, the hybrid proxy 100 generates a unicast DNS-SD response message based on received DNS-SD/mDNS response messages that are responsive to the DNS-SD/mDNS query of step 202 (i.e., the messages received at steps 206 and 208). Depending upon the implementation, the hybrid proxy 100 may wait until a given time interval has expired before generating the unicast DNS-SD response message; this may include, for example, using a timer that was started when step 204 was performed, and then waiting until the timer expires to analyze received response messages and generate the corresponding unicast DNS-SD response message.

At step 210, the hybrid proxy 100 may generate the unicast DNS response message such that its "Answer" field includes a resource record for each of the received DNS-SD/mDNS response messages. As with the received DNS-SD/mDNS response messages, the RDATA fields in the resource records may specify a service instance using the format <instance>.<service-type>.<domain>. However, unlike with the received response messages, the hybrid proxy 100 may set the <domain> portions to use global domain names instead of the ".local" mDNS domain. To do this, step 210 may include the hybrid proxy 100 translating from the ".local" domain indicated in the DNS-SD/mDNS messages from steps 206 and 208 to global domains.

Continuing with the above example of Tables B.1-B.4, the hybrid proxy 100 may generate this unicast DNS response message such that the "Answer" section includes two resource records (i.e., one record for each of the received mDNS messages), which include values such as those shown in Table B.5:

TABLE B.5

| Resource Records in Answer Section in Exemplary Unicast DNS-SD Response | |
|---|---|
| Field | Value |
| Resource Record One | |
| NAME | __printer.__tcp.Building A.example.com |
| TYPE | PTR |
| RDATA | PrinterA.__printer.__tcp.Building A.example.com |
| Resource Record Two | |
| NAME | __printer.__tcp.Building A.example.com |
| TYPE | PTR |
| RDATA | PrinterB.__printer.__tcp.Building A.example.com |

As shown in Table B.5, the <domain> portions of the NAME and RDATA fields have been changed from those shown in Tables B.3 and B.4 (i.e., from ".local" to "Building A.example.com").

At step 212, the hybrid proxy 100 transmits the unicast DNS-SD response message generated at step 210 to the SSD 130. Upon receiving the unicast DNS-SD response message at step 212, the SSD 130 may perform a number of different actions. For example, in an instance where the SSD 130 displays a user interface, the user interface may be updated to reflect the information indicated in the received unicast DNS-SD response message. Continuing with the above example of Tables B.1-B.5, the SSD 130 might display a listing of available printing services on its user interface, and might update the listing to show that "PrinterA" and "PrinterB" service instances are available on the "Building A.example.com" domain.

At step 214, the SSD 130, in conjunction with the hybrid proxy 100, SPD A 120, and/or SPD B 122, may perform one or more actions to set up services, based on the information provided to the SSD 130 at step 212. As one example, if the SSD 130 displays a listing of available service instances in a user interface, the user may provide user input indicating that the user would like to use a particular service instance; in response to this user input, the SSD 130 may communicate with the hybrid proxy 100 to obtain additional configuration information (formatted as, for example, DNS SRV and DNS TXT records) required to initiate the selected service with the selected host. Continuing with the above example of Tables B.1-B.5, the user might choose to print a document using the "PrinterA" service instance; if so, the SSD 130 may obtain the required configuration information (formatted as, for example, DNS SRV and DNS TXT records) by transmitting appropriate additional DNS query messages to the hybrid proxy 100.

Alternatively or additionally, step 214 may include the SSD 130, in conjunction with the hybrid proxy 100, SPD A 120, and/or SPD B 122, communicating data in order to perform the service. Referring again to the above example, if the SSD 130 has obtained configuration information to initiate the "Printer A" service instance, this may include the SSD 130 transmitting information that describes a document to SPD A 120 for printing, and may include SPD A 120 printing the document. As another example, in an instance where the SSD 130 searched for a networked file system service, this may include the SSD 130 sending file data to and/or receiving file data from SPD A 120 and/or SPD B 122.

Although FIG. 2 shows the steps occurring in a particular order, this is only one example of how the steps shown in FIG. 2 may be ordered, and many variations on the order shown in FIG. 2 may be used. Additionally, the steps shown in FIG. 2 as being performed at different times may in some instances be performed concurrently and/or otherwise substantially at the same time. For example, while FIG. 2 shows that step 208 is performed after step 206, it should be understood that these steps may be performed according to any temporal relationship (i.e., either step may be performed before the other, or they may be performed concurrently or substantially at the same time).

Alternatively or additionally, as one variation on the above-described features, instead of SPD A 120 and SPD B 122 transmitting mDNS/SD response messages at steps 206 and 208, these response messages may instead be unicast DNS-SD response messages. In such an instance, the hybrid proxy 100 may set the top bit in the QCLASS field in the question entry in the DNS-SD/mDNS query sent at step 204 as a "unicast response" bit; in response to this "unicast response" bit, SPD A 120 and SPD B 122 would format their response messages as unicast DNS-SD response messages. (In these unicast DNS-SD response messages, the ".local" domain would still be used in the <instance>.<service-type>.<domain> strings.)

Alternatively or additionally, as another variation on the method shown in FIG. 2, instead of issuing a DNS-SD/mDNS query in response to receiving the DNS-SD query (at step 200), the hybrid proxy 100 may periodically query SPD A 120 and SPD B 122 regarding the services they provide, and then store information regarding the received responses in a database/cache (which may be stored, for example, as DNS SRV/PTR/TXT records); then, instead of generating/issuing a DNS-SD/mDNS query (as shown in steps 202-204), the hybrid proxy 100 could use the stored information in the database/cache to generate the unicast DNS-SD response (as described above with reference to step 210).

FIGS. 3A-3B—Method for Service Discovery

FIGS. 3A-3B show a second method for performing service discovery. In the method of FIGS. 3A-3B, as will be described in further detail below, the hybrid proxy 100 receives a service discovery query; in response to the service discovery query, the hybrid proxy 100 provides an initial answer to the query (based on information that may already be stored at the hybrid proxy 100). The hybrid proxy 100 then also issues queries on the link 142, and provides follow-up answers to the query if the queries on the link 142 provide information that matches the query (beyond what may have been provided in the initial answer).

Before the method of FIGS. 3A-3B is performed, the hybrid proxy 100 may communicate with SPD A 120 and SPD B 122 to set up a database/cache of service information stored by the hybrid proxy 100. This database/cache may store information regarding the services offered by hosts on the link 142, including SPD A 120 and SPD B 122. The database/cache may store this service information as DNS resource records, including but not limited to PTR, SRV, and TXT resource records. The hybrid proxy 100 may obtain the service information by periodically sending DNS-SD/mDNS queries on the link 142, storing the corresponding response information received from devices on the link 142 (including SPD A 120 and SPD B 122) in the database/cache. Alternatively or additionally, SPD A 120 and/or SPD B 122 may use unsolicited mDNS response messages to announce the services that they offer (upon connecting to the local link 142, periodically, and/or when the services that they offer change), and the hybrid proxy 100 may update the service information in the database/cache accordingly. Alternatively or additionally, the hybrid proxy 100 may use other approaches for receiving and/or maintaining the service information.

The service information received by the hybrid proxy 100 from devices on the link 142 may indicate that the information is related to the ".local" domain. (For example, if SPD A 120 announces an available service instance using the format <instance>.<service-type>.<domain>, the <domain> portion will indicate that the domain is ".local.") As will be described in further detail below, the hybrid proxy 100 provides responses to queries, where the responses include global (not ".local") domain names. As will also be described in further detail below, depending upon the implementation, the hybrid proxy 100 may store information in its database/cache using the ".local" domain, and then translate to global names on an as-needed basis (i.e., when responding to a specific query); alternatively, the hybrid proxy 100 may replace ".local" names with corresponding global names, and then store the translated information with the global names. In another alternative, the hybrid proxy 100 may store duplicate information that includes both ".local" and global names; and/or the hybrid proxy 100 may store other information in order to provide global names when needed.

As shown in FIG. 3A, the method includes an "LLQ Setup" phase 370 (which includes a number of steps described in detail below), during which the SSD 130 and the hybrid proxy 100 set up/establish an LLQ question and during which the hybrid proxy 100 provides an initial answer based on information stored in its database/cache.

At step 300, as shown in FIG. 3A, the SSD 130 transmits a unicast DNS-SD/DNS-LLQ Initial Request message to the hybrid proxy 100. This message may be a DNS query message, and may include one or more question entries in its Question section, as well as one or more corresponding DNS-LLQ metadata entries in its Additional field. In an example where the hybrid proxy 100 is assigned to subdomain "Building A.example.com" and where this message asks for instances of a Network File System (NFS) service, this message may include a question entry and an LLQ metadata entry that include values such as those shown in Table C.1:

TABLE C.1

| Exemplary DNS-SD/DNS-LLQ Initial Request | |
|---|---|
| Field | Value |
| Question Entry in Question Section | |
| QNAME | _nfs._tcp.Building A.example.com |
| QTYPE | PTR |
| QCLASS | IN |
| LLQ Metadata Entry in RDATA in OPT RR in Additional Section | |
| OPTION-CODE | LLQ |
| LLQ-OPCODE | LLQ-SETUP |
| LLQ-ID | 0 |

At step 302, the hybrid proxy 100 processes the received Initial Request message (from step 300), generates a unicast DNS-SD/DNS-LLQ Setup Challenge message that is responsive to the received Initial Request message, and transmits the Setup Challenge message to the SSD 130. Continuing with the example of Table C.1, this message may include a question entry and an LLQ metadata entry that include values such as those shown in Table C.2 (note that the identifier "randomID123456789" is a random identifier that would be generated by the hybrid proxy 100):

TABLE C.2

| Exemplary DNS-SD/DNS-LLQ Setup Challenge | |
|---|---|
| Field | Value |
| Question Entry in Question Section | |
| QNAME | _nfs._tcp.Building A.example.com |
| QTYPE | PTR |
| QCLASS | IN |
| LLQ Metadata Entry in RDATA in OPT RR in Additional Section | |
| OPTION-CODE | LLQ |
| LLQ-OPCODE | LLQ-SETUP |
| LLQ-ID | randomID123456789 |

At step 304, the SSD 130 processes the received Setup Challenge message (from step 302), generates a unicast DNS-SD/DNS-LLQ Challenge Response message that is responsive to the received Setup Challenge message, and transmits the Challenge Response message to the hybrid proxy 100. Continuing with the example of Tables C.1-C.2, this message may include a question entry and an LLQ metadata entry that include values such as those shown in Table C.3:

TABLE C.3

| Exemplary DNS-SD/DNS-LLQ Challenge Response | |
|---|---|
| Field | Value |
| Question Entry in Question Section | |
| QNAME | _nfs._tcp.Building A.example.com |
| QTYPE | PTR |
| QCLASS | IN |

TABLE C.3-continued

| Exemplary DNS-SD/DNS-LLQ Challenge Response | |
|---|---|
| Field | Value |
| LLQ Metadata Entry in RDATA in OPT RR in Additional Section | |
| OPTION-CODE | LLQ |
| LLQ-OPCODE | LLQ-SETUP |
| LLQ-ID | randomID123456789 |

At step 306, the hybrid proxy 100 processes the received Challenge Response message (from step 304) and generates a unicast DNS-SD/DNS-LLQ ACK/Answers message that is responsive to the received Challenge Response message. This step may also include the hybrid proxy 100 analyzing its database/cache to determine if any information in the database/cache matches the question(s) in the Challenge Response message (which were the same or identical as the question(s) received in the Initial Request message of step 300), and populating the ACK/Answers message with this information, as appropriate.

The ACK/Answers message generated by the hybrid proxy 100 at step 306 may include an Answer section, and information regarding services that meet the criteria of the question(s) in the Challenge Response may be included as PTR resource records in the Answer section. In the PTR resource records, the NAME and RDATA fields may include domain names, and the hybrid proxy 100 may generate the ACK/Answers message such that the domain names are global domain names. If the hybrid proxy 100 stores service information in terms of ".local" domains, then step 306 may include the hybrid proxy 100 translating from stored ".local" to corresponding global domain names for inclusion in the ACK/Answers message.

Continuing with the example of Tables C.1-C.2, the hybrid proxy 100 may store information in its database/cache, but according to this example, none of the information in the database/cache matches the question from the Challenge Response message. Therefore, the hybrid proxy 100 may, at step 306, generate an ACK/Answers message that provides a "blank" response (i.e., that includes no matching answers, with the ANCOUNT field in the header set to a value of zero); this ACK/Answers message may include values such as those shown in Table C.4:

TABLE C.4

| Exemplary DNS-SD/DNS-LLQ ACK/Answers LLQ Metadata Entry in RDATA in OPT RR in Additional Section | |
|---|---|
| Field | Value |
| OPTION-CODE | LLQ |
| LLQ-OPCODE | LLQ-SETUP |
| LLQ-ID | randomID123456789 |

At step 308, the hybrid proxy 100 transmits the ACK/Answers message generated at step 306 to the SSD 130. Upon receiving the ACK/Answers message, the SSD 130 may perform a number of different actions. For example, in an instance where the SSD 130 displays a user interface, the user interface may be updated to reflect the information indicated in the received ACK/Answers message.

Referring now to FIG. 3B, the method of FIGS. 3A-3B includes an "Update" phase 380 (which includes a number of steps described in detail below), during which hybrid proxy 100 may obtain additional information that is responsive to the long-lived query established during the "LLQ Setup" phase 370 and may provide the additional information to the SSD 130.

At step 312, the hybrid proxy 100 may generate and transmit (on the link 142) a DNS-SD/mDNS query message that corresponds to the question(s) in the Initial Request message received at step 300. This involves translating the global domain name in the QNAME field in the Initial Request question entry to the ".local" domain used for mDNS queries. Continuing with the example of Tables C.1-C.4, the hybrid proxy 100 may generate a DNS-SD/mDNS query message with a question entry that includes values such as those shown in Table C.5:

TABLE C.5

Question Entry for Exemplary DNS-SD/mDNS Query

| Field | Value |
|---|---|
| QNAME | _nfs._tcp.local |
| QTYPE | PTR |
| QCLASS | IN |

At step 314, SPD A 120 processes the DNS-SD/mDNS query message of step 312, generates a DNS-SD/mDNS response message that is responsive to the query message, and transmits (on the link 142) the generated DNS-SD/mDNS response message.

Continuing with the above example of Tables C.1-C.5, SPD A 120 may provide the NFS service using the instance name "File Server A," and SPD A 120 may generate and transmit at step 314 a DNS-SD/mDNS response message with a PTR resource record with values such as those shown in Table C.6:

TABLE C.6

Resource Record in Answer Section in Exemplary DNS-SD/mDNS Response

| Field | Value |
|---|---|
| NAME | _nfs._tcp.local |
| TYPE | PTR |
| RDATA | File Server A._nfs._tcp.local |

At step 316, the hybrid proxy 100 processes the DNS-SD/mDNS response message of step 314 and, in the event that the message indicates that the hybrid proxy 100 should provide an LLQ update to the SSD 130, the hybrid proxy 100 may generate a corresponding DNS-LLQ Event Response message for transmission to the SSD 130. This step may include the following:

(a) the hybrid proxy 100 may compare information received in the received DNS-SD/mDNS response message to determine: (i) whether and/or to what extent the received information is different from the information already stored in the database/cache stored by the hybrid proxy 100, and to what extent the hybrid proxy 100 has already provided this information to the SSD 130 (in the event that the received information includes no new information, then the hybrid proxy 100 does not need to provide an update to the SSD 130); and (ii) whether and/or to what extent the received information matches the question(s) from the long-lived query that was set up in the LLQ Setup phase 370 (in the event that the received information does not match the question(s) from the long-lived query, then the hybrid proxy 100 does not need to provide an update to the SSD 130);

(b) in the event that the hybrid proxy 100 determines that an update should be provided to the SSD 130, the hybrid proxy 100 may generate a DNS-LLQ Event Response message to reflect the addition/deletion of matching service instances; the Event Response message may include one or more PTR resource records in the Answer section that identify the relevant service instances; and/or (c) the hybrid proxy 100 may generate the DNS-LLQ Event Response message such that it includes global domain names; this may include translating from ".local" names to global names, in a similar/analogous fashion as described above with reference to step 306.

Continuing with the above example of Tables C.1-C.6, in an instance where the hybrid proxy 100 determines at step 316 that an update with respect to the "File Server A" NFS instance should be provided to the SSD 130, the hybrid proxy 100 may generate an Event Response message with values such as those shown in Table C.7:

TABLE C.7

Exemplary DNS-LLQ Event Response

| Field | Value |
|---|---|
| **Question Entry in Query Section** | |
| QNAME | _nfs._tcp.Building A.example.com |
| QTYPE | PTR |
| QCLASS | IN |
| **Resource Record in Answer Section** | |
| NAME | _nfs._tcp.Building A.example.com |
| TYPE | PTR |
| RDATA | File Server A._nfs._tcp.Building A.example.com |
| **LLQ Metadata Entry in RDATA in OPT RR in Additional Section** | |
| OPTION-CODE | LLQ |
| LLQ-OPCODE | LLQ-EVENT |
| LLQ-ID | randomID123456789 |

At step 318, the hybrid proxy 100 transmits the Event Response message generated at step 316 to the SSD 130. Upon receiving the Event Response message, the SSD 130 may perform a number of different actions. For example, in an instance where the SSD 130 displays a user interface, the user interface may be updated to reflect the information indicated in the received Event Response message (in a similar/analogous fashion as described above with reference to step 308).

At step 320, SPD B 122 processes the DNS-SD/mDNS query message of step 312, generates a DNS-SD/mDNS response message that is responsive to the query, and transmits (on the link 142) the generated DNS-SD/mDNS response message. Referring to the above example of Tables C.1-C.7, in an instance where SPD B 122 provides the NFS service using the instance name "File Server B," SPD B 122 may generate and transmit at step 320 a DNS-SD/mDNS response message with a PTR resource record with values such as those shown in Table C.8:

TABLE C.8

Resource Record in Answer Section in Exemplary DNS-SD/mDNS Response

| Field | Value |
|---|---|
| NAME | _nfs._tcp.local |
| TYPE | PTR |
| RDATA | File Server B._nfs._tcp.local |

At steps 322 and 324, the hybrid proxy 100 may perform similar/analogous actions as those described above with respect to step 316, based on the DNS-SD/mDNS response message received at step 320.

Continuing with the above example of Tables C.1-C.8, in an instance where the hybrid proxy 100 determines at step 322 that an update with respect to the "File Server B" NFS instance should be provided to the SSD 130, the hybrid proxy 100 may generate an Event Response message with values such as those shown in Table C.9:

TABLE C.9

Exemplary DNS-LLQ Event Response

| Field | Value |
|---|---|
| Question Entry in Query Section | |
| QNAME | _nfs._tcp.Building A.example.com |
| QTYPE | PTR |
| QCLASS | IN |
| Resource Record in Answer Section | |
| NAME | _nfs._tcp.Building A.example.com |
| TYPE | PTR |
| RDATA | File Server B._nfs._tcp.Building A.example.com |
| LLQ Metadata Entry in RDATA in OPT RR in Additional Section | |
| OPTION-CODE | LLQ |
| LLQ-OPCODE | LLQ-EVENT |
| LLQ-ID | randomID123456789 |

At step 326, the SSD 130, in conjunction with the hybrid proxy 100, SPD A 120, and/or SPD B 122, may perform one or more actions to set up services, based on the information provided to the SSD 130 in the ACK/Answers message of step 310 and/or the Event Response messages of steps 318 and/or 324. For example, the user may provide user input (via a user interface displayed by the SSD 130) indicating that the user would like to use a particular service instance; in response to this user input, the SSD 130 may communicate with the hybrid proxy 100 to obtain configuration information (formatted as, for example, DNS SRV and DNS TXT records) that may be used to initiate the selected service. Continuing with the above example of Tables C.1-C.9, the user might choose to transfer files using the "File Server B" NFS service instance; if so, the SSD 130 may obtain the configuration information (i.e., DNS SRV and DNS TXT records) by transmitting appropriate DNS query messages to the hybrid proxy 100.

Alternatively or additionally, step 326 may include the SSD 130, in conjunction with the hybrid proxy 100, SPD A 120, and/or SPD B 122, communicating data in order to perform the service. Referring again to the above example, if the SSD 130 has obtained configuration information to initiate the NFS service with SPD B 122, step 326 may include the SSD 130 and SPD B 122 transmitting data to perform the transfer of one or more files.

Although FIG. 3 shows the steps occurring in a particular order, this is only one example of how the steps shown in FIG. 3 may be ordered, and many variations on the order shown in FIG. 3 may be used. Further, the steps shown in FIG. 3 as being performed at different times may in some instances be performed concurrently and/or otherwise substantially at the same time. As one example, the LLQ Setup phase 370 and the Update phase 380 may be performed concurrently and/or substantially at the same time (such that each or any of the steps from each respective phase are interleaved temporally with respect to each or any steps from the other respective phase).

Alternatively or additionally, instead of SPD A 120 and SPD B 122 transmitting DNS-SD/mDNS response messages at steps 314 and 320, these response messages may instead be unicast DNS-SD response messages. In such an instance, the hybrid proxy 100 may set the top bit in the QCLASS field in the question entry in the DNS-SD/mDNS query message sent at step 312 as a "unicast response" bit, and SPD A 120 and SPD B 122 would format their response messages as unicast DNS-SD response messages.

Alternatively or additionally, instead of the actions of step 326 being performed after the Update phase 380, similar/analogous actions to those described above as being performed in step 326 may be performed (including while the Update phase 380 is occurring) based solely on information received/transmitted in the ACK/Answers message from step 310 of the LLQ Setup phase 370. In other words, the SSD 130 may connect to a service-providing host and receive/perform a service based solely on the information received during the LLQ Setup phase 370; this may be performed while the Update phase 380 is ongoing, or after the Update phase 380 is complete. Alternatively or additionally, instead of the actions of step 326 being performed after the Update phase 380 is complete, similar/analogous actions to those described above as being performed in step 326 may be performed while the Update phase 380 is ongoing, based on one or more of (a) information received/transmitted in the ACK/Answers message from step 310 of the LLQ Setup phase 370, and (b) information already received during the Update phase 380. For example, the SSD 130 may connect to a service-providing host before receiving all of the update information that will be communicated to the SSD 130 during the Update phase 380; i.e., the SSD 130 may connect to SPD A 120 before or substantially concurrent with receiving information related to SPD B 122 in step 324.

Alternatively or additionally, the hybrid proxy 100 may not maintain a database/cache, and always provide a "blank" response (i.e., an ACK/Answers message that includes no matching answers, with the ANCOUNT field in the header set to a value of zero) at step 306; in such an instance, the remainder of the method of FIGS. 3A-3B would be performed substantially as described above, except that actions described above related to the database/cache would be omitted.

As described above, the hybrid proxy 100 may receive two DNS-SD/mDNS response messages (at steps 314 and 320), and may transmit two separate DNS-LLQ Event Response messages based on these two DNS-SD/mDNS response messages (at steps 318 and 324). In other words, as shown in FIG. 3B, the hybrid proxy 100 may be seen as transmitting a DNS-LLQ response message as soon as each of the DNS-LLQ Event Response messages is received and processed. As a variation, instead of transmitting a separate DNS-LLQ Event Response message for each received DNS-SD/mDNS response message, the hybrid proxy 100 may handle received DNS-SD/mDNS response messages in batches. This may be performed by the hybrid proxy 100 in a number of different ways; as one example, if a set of two or more DNS-SD/mDNS response messages are received within a given time interval of each other, the hybrid proxy 100 may generate and transmit a single DNS-LLQ Event Response message that includes information (i.e., Answer resource records) related to all of the set of DNS-SD/mDNS response messages. Alternatively or additionally, the hybrid proxy 100 may use a timer, and take actions similar/analogous to those described above with respect to the timer used by the hybrid proxy 100 in steps 202-210 of FIG. 2.

FIG. 4—Exemplary Hardware for Implementing Described Concepts

FIG. 4 shows an exemplary computing device 400 that may be used to implement functionality described herein. The computing device 400 may include a network interface 402, volatile memory 404, storage memory 406, and processor 408, which are connected via system bus 410.

The processor 408 may be a physical component such as an integrated circuit that may include integrated logic configured or configurable to perform data processing and related actions. The processor 408 may be or include, for example, a single- or multi-core processor, a conventional processor, a special purpose processor, a digital signal processor (DSP), a plurality of microprocessors, one or more microprocessors in association with a DSP core, a controller or microcontroller, one or more Application Specific Integrated Circuits (ASICs), one or more Field Programmable Gate Array (FPGA) circuits, or a system-on-a-chip (SOC).

The memory device 404 may be or include a device such as a RAM (such as a DRAM or SRAM), or other type of device for volatile or non-volatile data storage. The storage device 406 may be or include a hard disk, a flash memory, a magneto-optical medium, an optical medium, or other type of device for non-volatile data storage.

The network interface 402 may be, for example, a communications port, a wired communications IC, a wireless communications IC, a network card, or other type of device for communicating via a wired or wireless network. The network interface 402 may be capable of communicating using technologies such as Ethernet, fiber optics, microwave, xDSL (Digital Subscriber Line), IEEE Wi-Fi technology (e.g., 802.11a, 802.11b, 802.11g, 802.11n, and/or 802.11ac), wireless cellular technology (such as GSM/EDGE, CDMA2000, UMTS, LTE, or LTE-A), and/or any other appropriate wired or wireless communication technology.

An instance of the electronic device 400 of FIG. 4 may be configured to perform any feature or any combination of features described herein as performed by the SSD 130. In such an instance, the electronic device 400 may be connected to a display device (such as an LCD, LED, or OLED monitor) or may include a display device (such as a touchscreen based on LCD or LED/OLED technology), and/or may be connected to and/or include an input device, such as a keyboard, mouse, touchpad, or touchscreen. The memory device 404 and/or the storage device 406 may store instructions which, when executed by the processor 408, cause the processor 408 to perform (in conjunction, as appropriate, with the network interface 402, memory device 404, storage device 406, a display device, and/or an input device) any feature or any combination of features described above as performed by the SSD 130. Alternatively or additionally, each or any of the messages described herein as processed and/or generated by the SSD 130 may be processed/generated by the processor 408 and may be stored in the memory device 404; further, each or any of the messages described herein as received and/or transmitted by the SSD 130 may be received/transmitted via the network interface 402.

An instance of the electronic device 400 of FIG. 4 may be configured to perform any feature or any combination of features described herein as performed by a service-providing device (e.g., SPD A 120 or SPD B 122). In such an instance, the electronic device 400 may be connected to and/or include a display device, and/or may be connected to and/or include an input device. Alternatively or additionally, in an instance where the electronic device 400 is, for example, a printer, camera, or other type of device, the electronic device 400 may also include additional functional components appropriate to that type of device (e.g., a printer drum and paper feeder, or CMOS sensor and lens). The memory device 404 and/or the storage device 406 may store instructions which, when executed by the processor 408, cause the processor 408 to perform (in conjunction with the network interface 402, memory device 404, storage device 406, a display device, an input device, and/or other additional functional components) any feature or any combination of features described above as performed by SPD A 120 or SPD B 122. Alternatively or additionally, each or any of the messages described herein as processed and/or generated by SPD A 120 or SPD B 122 may be processed/generated by the processor 408 and may be stored in the memory device 404; further, each or any of the messages described herein as received and/or transmitted by SPD A 120 or SPD B 122 may be received/transmitted via the network interface 402.

An instance of the electronic device 400 of FIG. 4 may be configured to perform any feature or any combination of features described herein as performed by the hybrid proxy 100. The memory device 404 and/or the storage device 406 may store instructions which, when executed by the processor 408, cause the processor 408 to perform (in conjunction, as appropriate, with the network interface 402, memory device 404, storage device 406, a display device, and/or an input device) any feature or any combination of features described above as performed by the hybrid proxy 100. Alternatively or additionally, each or any of the messages described herein as processed and/or generated by the hybrid proxy 100 may be processed/generated by the processor 408 and may be stored in the memory device 404 and/or storage device 406; further, each or any of the messages described herein as received and/or transmitted by the hybrid proxy 100 may be received/transmitted via the network interface 402. In an instance where the electronic device 400 also implements router functionality, the memory device 404 and/or storage device 406 may store information used for performing routing (such as routing tables). Alternatively or additionally, the processor 408 and/or the network interface 402 may include special-purpose components (for example, special-purpose DSP hardware in the processor 408 and/or network interface 402) for performing routing functionality.

Further Applications of Described Concepts

While the foregoing description includes examples that involve a single service-searching device (SSD 130) and two service-providing devices (SPD A 120 and SPD B 122), this is done for ease of description; the features described herein may be used, mutatis mutandis, with any number of devices that search for and/or provide services. It should also be understood that a single device may both search for and provide services, using the techniques described herein.

Alternatively or additionally, although features are described herein with reference to FIGS. 1-4 as being performed using the exemplary architecture 170 of FIG. 1, the features described herein may be implemented, mutatis mutandis, using any appropriate network architecture and/or in any appropriate computing environment. For example, although FIGS. 1-4 show the SSD 130 communicating with the hybrid proxy 100 via the Internet 150, the features described herein may be also used, mutatis mutandis, in an instance where a service-searching device that operates on a first link within a private network may discover (and receive/perform) services offered by devices on a second link within that same private network. In such an instance, the communications between the service-searching device and the hybrid proxy may not traverse the Internet, but may only traverse links within the private network.

Although examples are provided herein with reference to FIGS. 1-4 regarding particular services (i.e., printing service and NFS service), the features described herein may be used for service discovery of any appropriate type of service.

Although examples are provided herein with reference to technologies such as DNS, DNS-SD, mDNS, and DNS-LLQ, the features described herein are also applicable, mutatis mutandis, to any technology that may be used for service discovery. For example, the features described herein may used with technologies such as Universal Plug and Play (UPnP)/Simple Service Discovery Protocol (SSDP), Service Location Protocol (SLP), Jini/River, and/or other technologies. Alternatively or additionally, although specific exemplary message formats are described herein (i.e., particular DNS/DNS-SD/mDNS/DNS-LLQ messages with particular fields, and so on), these message formats should be understood to be illustrative, and any other messages that include identical, similar, or analogous data (whether formatted according to DNS/DNS-SD/mDNS/DNS-LLQ technology and/or other technologies such as but not limited to SSDP or SLP) may, mutatis mutandis, also be used.

Although features and elements are described herein in particular combinations, each feature or element can be used alone or in any combination with or without the other features and elements. For example, each feature or element as described above with reference to FIGS. 1-4 may be used alone without the other features and elements or in various combinations with or without other features and elements. Sub-elements of the methods and features described above with reference to FIGS. 1-4 may be performed in any arbitrary order (including concurrently), in any combination or sub-combination.

What is claimed is:

1. A method for use in a proxy device, the method comprising:

receiving, by the proxy device, a unicast Domain Name System Service Discovery (DNS-SD) query message from a querying host, the unicast DNS-SD query message comprising a request for information regarding services available on a link;

generating, by the proxy device, a multicast DNS (mDNS) query message based at least in part on the unicast DNS-SD query message, wherein the generating the mDNS query message comprises translating a global domain name in the unicast DNS-SD query message to a ".local" domain name in the mDNS query message;

transmitting, by the proxy device and to one or more service-providing devices on the link, the mDNS query message on the link;

receiving, by the proxy device and from the one or more service-providing devices, one or more messages responsive to the mDNS query message, wherein the one or more messages indicate the services available on the link;

generating, by the proxy device, a response message based at least in part on the one or more messages, wherein the response message indicates the services available on the link, and wherein the generating the response message comprises translating the ".local" domain name in the one or more messages to the global domain name to include in the response message; and transmitting, by the proxy device, the response message to the querying host.

2. The method of claim 1, wherein the generating the response message and the transmitting the response message comprise:

generating a unicast DNS-SD response message based at least in part on the one or more messages; and transmitting the unicast DNS-SD response message to the querying host.

3. The method of claim 2, wherein the generating the unicast DNS-SD response message comprises waiting for a timer to expire prior to generating the unicast DNS-SD response message, and wherein the timer is associated with an amount of time to analyze the unicast DNS-SD response message from the querying host.

4. A proxy device, comprising:

a processor; and a memory communicatively coupled to the processor, wherein the memory is configured to store instructions to cause the processor to:

receive, by the proxy device, a unicast Domain Name System Service Discovery (DNS-SD) query message from a querying host, the unicast DNS-SD query message comprising a request for information regarding services available on a link;

generate, by the proxy device, a multicast DNS (mDNS) query message based at least in part on the unicast DNS-SD query message, wherein to generate the mDNS query message, the memory is configured to store instructions to cause the processor to translate a global domain name in the unicast DNS-SD query message to a ".local" domain name in the mDNS query message;

transmit, by the proxy device and to one or more service-providing devices on the link, the mDNS query message on the link;

receive, by the proxy device and from the one or more service-providing devices, one or more messages responsive to the mDNS query message, wherein the one or more messages indicate the services available on the link;

generate, by the proxy device, a response message based at least in part on the one or more messages, wherein the response message indicates the updated services available on the link, and wherein to generate the response message, the memory is configured to store instructions to cause the processor to translate the ".local" domain name in the one or more messages to the global domain name to include in the response message; and transmit, by the proxy device, the response message to the querying host.

5. The proxy device of claim 4, wherein the memory is configured to store instructions to cause the processor, while generating the response message and transmitting the response message, to:

generate a unicast DNS-SD response message based at least in part on the one or more messages; and transmit the unicast DNS-SD response message to the querying host.

6. The proxy device of claim 5, wherein the memory is configured to store instructions to cause the processor to wait for a timer to expire prior to generating the unicast DNS-SD response message, wherein the timer is associated with an amount of time to analyze the unicast DNS-SD response message from the querying host.

7. A method, comprising:

receiving, by a proxy device, a first query message from a querying host, the first query message configured in a first data format and comprising a request for information regarding one or more services available on a link, wherein the one or more services are provided by a local electronic device on the link;

transmitting, by the proxy device and to the local electronic device, a second query message to the local electronic device on the link, wherein the second query message is configured in a second data format different from the first data format;

receiving, by the proxy device and from the local electronic device, one or more messages responsive to the second query message, wherein the one or more messages indicate the one or more services provided by the local electronic device available on the link;

generating, by the proxy device, a unicast Domain Name System Service Discovery (DNS-SD) response message based at least in part on the one or more messages, wherein the unicast DNS-SD response message indicates the one or more services available on the link, wherein the generating the unicast DNS-SD response message comprises translating a first domain name in the one or more services to a second domain name to include in the unicast DNS-SD response message, wherein the generating the unicast DNS-SD response message comprises waiting for a timer to expire prior to generating the unicast DNS-SD response message, and wherein the timer is associated with an amount of time to analyze the unicast DNS-SD response message from the querying host; and transmitting, by the proxy device, the unicast DNS-SD response message to the querying host.

8. The method of claim 7, wherein the receiving the first query message comprises receiving a unicast DNS-SD query message from the querying host, wherein the unicast DNS-SD query message comprises a question that indicates a request for information regarding the one or more services available on the link.

9. The method of claim 8, wherein the transmitting the second query message comprises:

generating a multicast DNS (mDNS) query message based at least in part on the unicast DNS-SD query message; and transmitting the mDNS query message on the link.

10. The method of claim 9, wherein the first domain name comprises a ".local" domain name and the second domain name comprises a global domain name;

wherein the generating the mDNS query message comprises translating the global domain name in the unicast DNS-SD query message to the ".local" domain name in the mDNS query message; and wherein the generating the unicast DNS-SD response message comprises translating from the ".local" domain name in the one or more messages to the global domain name to include in the unicast DNS-SD response message.

* * * * *